United States Patent
Leroux

[11] Patent Number: 5,890,858
[45] Date of Patent: Apr. 6, 1999

[54] CLAMP-LIKE SHEET METAL NUT WITH CENTERING STRIP

[75] Inventor: Alain Leroux, Notre-Dame de L'Osier, France

[73] Assignee: A. Raymond & Cie, France

[21] Appl. No.: 913,576
[22] PCT Filed: Mar. 21, 1996
[86] PCT No.: PCT/EP96/01223
§ 371 Date: Sep. 4, 1997
§ 102(e) Date: Sep. 4, 1997
[87] PCT Pub. No.: WO96/30659
PCT Pub. Date: Oct. 3, 1996

[30]  Foreign Application Priority Data

Mar. 30, 1995 [DE] Germany ............ 195 11 802.2

[51] Int. Cl.⁶ .................................................. F16B 37/02
[52] U.S. Cl. ................................................... 411/175
[58] Field of Search .................................. 411/174, 175, 411/172, 112, 111, 999, 970

[56]  References Cited

U.S. PATENT DOCUMENTS

| 4,729,706 | 3/1988 | Peterson | 411/175 |
| 4,798,507 | 1/1989 | Olah | 411/175 |
| 5,039,264 | 8/1991 | Benn | 411/175 |

*Primary Examiner*—Flemming Saether
*Attorney, Agent, or Firm*—Gifford, Krass, Groh, Sprinkle, Anderson & Citkowski, P.C.

[57]  ABSTRACT

A clamp-style sheet metal nut having a self-centering strip. The nut has two legs resiliently spaced apart. One leg has a threaded boss, the other leg has a through-bore for accepting the thread fastener. The self-centering strip is formed by twisting an annular strip of metal cut from the second leg and supported by a pair of resilient arms. The self-centering strip forms a circular aperture for accepting the threaded member and extends up into the bore of the carrier plate.

2 Claims, 1 Drawing Sheet

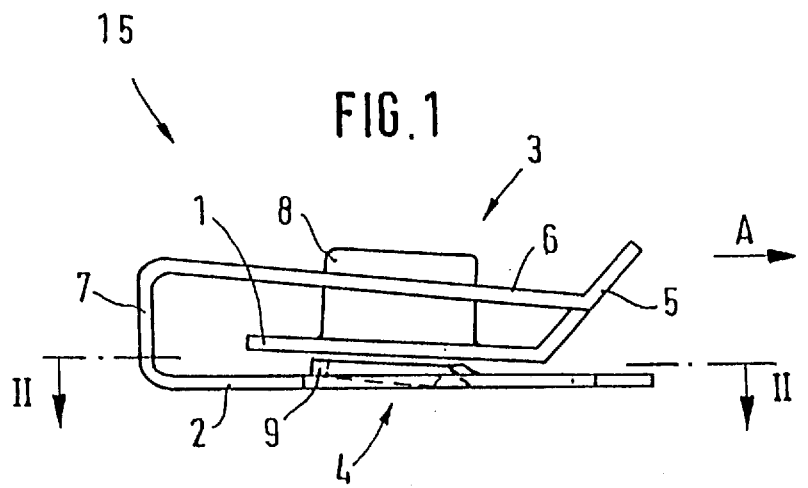
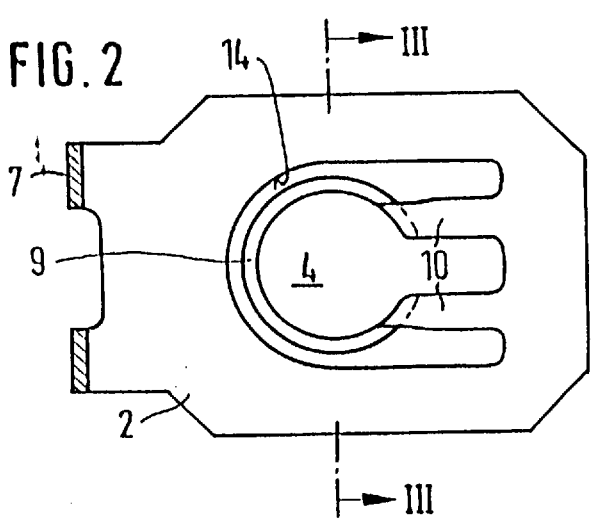
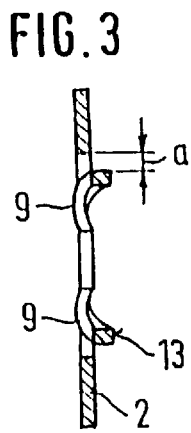
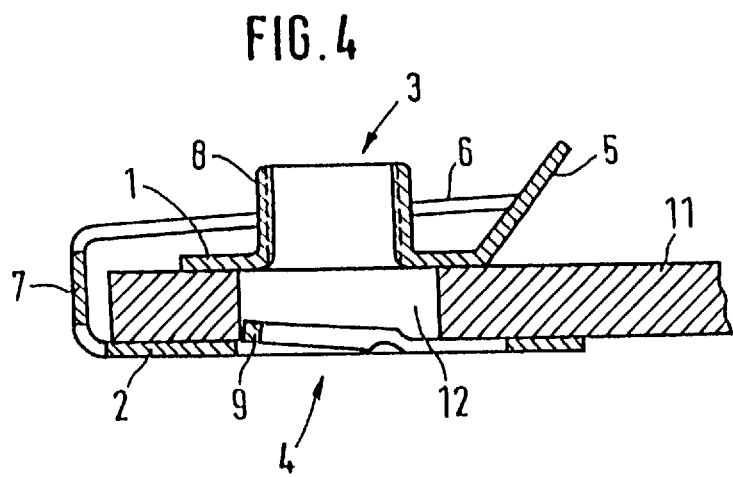

CLAMP-LIKE SHEET METAL NUT WITH CENTERING STRIP

BACKGROUND OF THE INVENTION

It is known to connect material to a carrier plate using a clamp-type sheet metal nut which is slipped onto a carrier plate. The sheet metal nut consists of two legs, connected to each other, with a pretapped plunged boss in one leg and a through-bore for a screw in the other leg. An annular centering strip is formed around at least three-fourths of the circumference of the through-bore; the rear region of the centering strip bends diagonally upward towards the threaded leg.

This type of slip-on nut is used for connecting a carrier plate, such as an auto body of a motor vehicle, to another component or sheet. The centering strip offers the advantage that the threaded portion of the sheet metal nut, when the former is being slipped on, is fixed precisely over the fastening hole of the carrier plate. When driving in the screw, the sheet metal nut no longer must be held, which means that assembly is greatly facilitated, particularly when the fastening hole is difficult to access.

If the sheet metal of the carrier plate is coated with a protective coating, e.g., a lacquer coating, then it should not be damaged by the fastening process. Therefore it is important that, as the sheet metal nut is being slipped on, the centering strip be able to spring back softly and, in this connection, without spring into the hole of the clamping leg from which the centering strip has been cut without damage. In order to fulfill said requirement, the centering strip in the prior art of the invention, in accordance with DE 2,828,078 C2, is cut such that it is surrounded by a region which has been cut free. However, the clamping leg must be of a wider design for the free punch, and requires a correspondingly wider sheet metal strip as starting material. In addition, the increased leg width may become an obstacle for narrow spatial conditions.

SUMMARY OF THE INVENTION

The purpose of the invention is to fashion a centering strip for the sheet metal nut such that with equally good spring-back properties the free punch may be largely omitted, and therefore less sheet metal material is required to produce the sheet metal nut.

The problem is solved in accordance with the present invention by the fact that a centering strip after it has been cut in, is bent 90° over its entire length consequentlyextending perpendicularly to the plane of the clamping leg. This results in an advantageous deeper entry of the centering strip into the fastening hole of the carrier plate, consequently yielding an improved centering effect. In addition, the outer diameter of a "on edge" centering strip is less than the outer diameter of a conventional centering strip which lays flat, such that the through-bore in the carrier plate may also be of a smaller design, corresponding with the smaller outer diameter of the centering strip.

The advantages of the invention become especially apparent in the centering ring formation in which the centering strip is connected to the clamping leg by means of two parallel strips which spring back gently, and the outer edge of the centering strip is turned to an "on edge" position between the connecting elements.

BRIEF DESCRIPTION OF THE DRAWINGS

The drawing represents an embodiment of a sheet metal nut in accordance with the invention which will be explained in greater detail in the following. Shown are:

FIG. 1: Shown is a side view of a clamp-type sheet metal nut,

FIG. 2: Shown is a horizontal sectional view taken through the sheet metal nut between the two legs, taken along line II—II of FIG. 1, FIG. 3: Shown is a sectional view taken through the clamping leg in accordance with line III—III of FIG. 2, and FIG. 4: Shown is the sheet metal nut, premounted on a carrier plate, in the centering position.

DETAILED DESCRIPTION OF THE PREFERRED EMBODIMENT

The sheet metal nut (15) represented in the FIGS. 1–4 consists of two C-shaped legs (1,2) connected to each other, with one leg (1) provided with a screw thread (3) in a boss (8) and the other leg (2) provided with a through-bore (4) for a screw (not shown) to be screwed into the thread (3).

In this regard, the thread bearing leg (1) is provided with an angled lead-in leg portion (5), which opens for sliding on to the carrier plate in the direction (A). In the present embodiment, the leg (1) is connected to the other clamping leg (2) by means of two elastic spring-back elements (6) and a transverse wall (7). This makes it possible for the thread bearing leg (1) to always lie flat on the carrier plate (11) when the sheet metal nut is slipped onto carrier plates of differing thicknesses.

The screw thread (3) is located in the tapped boss (8), which is formed on the thread bearing leg (1) using the known deep-draw method. Alternatively, a pretapped plunge boss having only one thread (3), for screwing in a sheet metal screw, may be provided in lieu of a tapped boss (8).

A centering strip (9) is formed on the clamping leg (2), around the through-bore (4), to extend around at least three-fourths of the circumference of the hole. The centering strip is connected to the clamping leg (2) by means of two parallel arms (10), such that it springs back gently. The centering strip has a rear region, when viewed in the slip-on direction "A", which bends upward toward the thread bearing leg (1). When a sheet metal nut is being slipped onto a carrier plate (11), (compare FIG. 4), said centering strip (9) serves to fix the sheet metal nut precisely over a fastening hole (12) of the carrier plate. The centering strip (9) initially yields to the plane of the clamping leg (2) and then springs back into the fastening hole (12) and locks in there.

As evident, in particular, from FIGS. 2 and 3, the entire length of the centering strip (9) is bent 90° with respect to the plane of the leg (2), with it being preferable to set the outer edge (13) of the centering strip "on edge". This results in a small distance "a" between the strip (9) and the cut edge (14) formed in the clamping leg (2) formed from stamping out the centering strip (9). This results in the advantage that the centering strip (9) may also deflect to the plane of the clamping leg (2), as in the prior art, but without a free punch.

To fabricate the clamp, a twisting or bending of the centering strip (9) into the "on edge" position may be achieved by simple means, such as placing a female mold under the strip (9). The inner diameter of the female mold is smaller than the outer diameter of a stamped out strip (9) which is still lying flat. The strip (9) is then pressed into said female mold with a stamp. The outer diameter of the stamp is somewhat greater than the inner diameter of a strip (9) when it is lying flat. The intermediate space between the stamp and female mold should be approximately equal to the thickness of the sheet metal of the centering strip (9), such that the strip (9) when plunged into the female mold is necessarily bent 90° to the "on edge" position.

I claim:

1. A clamp-type sheet metal nut for mounting to a carrier plate, said sheet metal nut comprising a pair of spaced legs, one of said legs having a threaded boss and an other of said legs having a through-bore, said other leg having an outer surface extending on a plane and an annular centering strip formed around the through-bore and extending around at least three-fourths of the circumference of the through-bore, the centering strip having an inner surface extending in an axial direction around the through-bore to a pair of twisted end portions twisted through an arc of 90° such that the inner surface is bent from the axial direction to extend along the plane of the outer surface.

2. The clamp-type sheet metal nut of claim 1, further comprising a pair of resilient parallel arms extending from the clamping leg to the centering strip.

* * * * *